United States Patent Office 2,716,096
Patented Aug. 23, 1955

2,716,096

STABILIZED ORGANIC COMPOSITIONS CONTAINING A KETONE CONDENSATION PRODUCT OF BISPHENYL TYPE COMPOUNDS

David W. Young, Westfield, Delmer L. Cottle, Highland Park, and Wilbur F. Fischer, Cranford, N. J., assignors to Esso Research and Engineering Company, a corporation of Delaware No Drawing. Original application March 27, 1951, Serial No. 217,884, now Patent No. 2,625,568, dated January 13, 1953. Divided and this application July 28, 1952, Serial No. 301,362

15 Claims. (Cl. 260—45.95)

This invention relates to the stabilization of organic compounds which tend to deteriorate in storage or in use due to undesirable oxidation reactions. In accordance with this invention, these organic compounds are stabilized against oxidation by incorporating therein small amounts of novel ketone condensation products of bisphenyl type compounds, more particularly ketone condensation products of bis (4,4' hydroxy) diphenyl alkanes, and (4 hydroxy, 4' alkoxy) diphenyl alkanes.

This application is a divisional application of U. S. application No. 217,884, filed March 27, 1951, now U. S. Patent No. 2,625,568 issued January 13, 1953.

Various organic compounds and mixtures, including mineral oils, resins, insecticides, soaps, lubricating oils, synthetic esters, branched chain alcohols, waxes, rubbers, polyolefins, such as polyisobutylene, polyethylene, etc., are adversely affected by oxygen, with the resultant formation of undesirable oxidation products, breakdown products, gums, and usually discoloration of the organic compounds as well as other deleterious reactions.

Thus, for example, in the oil refining industry, in order to prepare lubricating oils of superior quality, it is generally necessary to stabilize the oil against degradation which normally occurs due to oxidation of the hydrocarbon components. In general, hydrocarbon mixtures falling in the lubricating oil boiling range, if unstabilized, will, over a period of time under certain conditions, be subject to gum formation, sludge formation, the formation of acids, and the formation of objectionable color bodies.

It is also known that synthetic rubbers undergo changes due to further polymerization or degradation due to depolymerization on exposure to air and consequently yield on vulcanization inferior products unless there is incorporated therewith at time of synthesis a compound which stabilizes the synthetic rubber by largely preventing oxidation, degradation and/or cyclization of the chain molecules present in the polymer structure. Natural, as well as synthetic, rubbers require an antioxidant present in the vulcanizate in order that finished rubber products remain stable toward oxidation and heat during their useful life.

Bisphenols such as 2,2-di-(p-hydroxyphenyl)propane, hereafter referred to simply as diphenylol propane, have been tried previously as anti-oxidants for various organic materials such as wax, natural rubber, and as a stabilizer for unsaturated monomers which tend to polymerize in storage. However, these bisphenols proved to be generally inferior in products which may be subjected to elevated temperatures. The major difficulty in the use of conventional bisphenols as anti-oxidants has resided in their volatility. This volatility resulted in their being vaporized during use from the organic material at elevated temperatures to which they had been added as stabilizers.

It has now been found that ketone condensation products of particular bisphenyl-type compounds are extremely effective oxidation inhibitors and stabilizers for materials which usually degrade in the presence of air and/or heat. In addition, the compounds of this invention do not suffer from the above-listed disadvantages of the simple bisphenols and are particularly adapted for use in resins undergoing flexing aging conditions.

The chemical structures of these ketone condensation products of bis (4,4' hydroxy) diphenyl alkanes, and (4 hydroxy, 4' alkoxy) diphenyl alkanes have not been definitely established, but the major reaction products are believed to have the structure illustrated in Formula I below, and more particularly the structure exhibited in Formula II below:

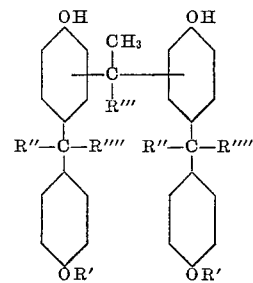

Formula I

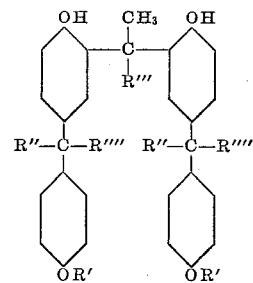

Formula II wherein R' is a radical selected from the group consisting of hydrogen and alkyl radicals having from 1 to 3 carbon atoms, R" and R"" are radicals, which can be the same or different, selected from the group consisting of hydrogen and alkyl radicals and the sum of the carbon atoms of R" and R"" does not exceed 5, and R'" is a radical selected from the group consisting of methyl and ethyl radicals. Particularly effective and desirable compounds of the class of compounds of this invention are the acetone condensation products of 2,2-(4-methoxy-4'-hydroxy) diphenyl propane and diphenylol propane. The structure of these products is apparent from the generic Formula I presented above.

It should be noted that the alkoxy or hydroxyl groups of the starting bisphenyl type compound occur para to the alkane linkage and that the final ketone condensation product has the two bisphenyl groups linked at a position ortho to the hydroxyl group. It is this particular configuration which is believed to impart the desired characteristics to the products of this invention.

In general, the compounds of this invention, which are solids, can be prepared by ketone condensations starting with the indicated bisphenols. These latter compounds are first prepared by condensing in a known manner two moles of a simple or a chlorine-substituted phenol with one mole of a ketone or aldehyde such as acetone, formaldehyde, methyl ethyl ketone, methyl n-butyl ketone, or methyl isobutyl ketone. If the (4-hydroxy-4'-methoxy) diphenyl alkane is to be condensed, it is first prepared by methods such as by reacting diphenylol propane under heat and pressure with one mole of methyl chloride and/or methyl iodide in the presence of compounds like potassium hydroxide and methyl alcohol.

The bisphenyl type compounds are then condensed with a ketone such as acetone, methyl ethyl ketone, etc. The general method of preparation is to react two moles of bis (4,4' hydroxy) diphenyl alkane, or (4 hydroxy, 4 alkoxy) diphenyl alkane with one mole of ketone, utilizing a catalyst such as hydrochloric acid, sulfuric acid, phosphoric acid, fluoro sulfonic, $BF_3 \cdot H_2SO_4$ mixtures, HF, etc. The catalysts are employed in a concentration of about 10 to 75%. A temperature of between 20° C. to 85° C. is employed. Solvents such as heptane, $CCl_4$, benzene, etc., may also be employed. The product comes out of solution usually in the form of a thick paste. It is then washed with water and air dried. High yields are obtained.

The following examples are given to illustrate this invention and include both the preparation of the products of this invention and test results on their use as anti-oxidants.

EXAMPLE I

*Preparation of condensation product of 2,2-(4-methoxy-4'-hydroxy) diphenyl propane and acetone*

2,2-(4-methoxy-4'-hydroxy) diphenyl propane was reacted at room temperature with acetone and HCl to form the acetone condensation product of 2(4-hydroxy phenyl), 2-(4-methoxy phenyl) propane. The reaction was conducted at 25° to 35° C. for 38 hours. Two moles of 2,2-(4-methoxy-4'-hydroxy) diphenyl propane were used per mole of acetone. The final product was washed well with water, recrystallized from a 50-50 mixture of benzene and heptane. The inspections on the product are listed:

FOUND IN SAMPLE

| | |
|---|---|
| Per cent C | 79.11 |
| Per cent H | 7.90 |
| Per cent ash | 0.01 |
| M. weight | 498 |

The yield of product was 87 mole per cent.

EXAMPLE II

*Preparation of condensation product of diphenylol propane and acetone*

Two moles of diphenylol propane were reacted with approximately 1.2 moles of acetone. The diphenylol propane was ground to a very fine powder before the start of the condensation reaction. Four moles of 98% $H_2SO_4$ were added as a catalyst. The mixture was placed on a mechanical shaker at 35° C. and agitated for 79 hours. The product became red in color during run. At the end, the sample was washed well with water to remove acid and any unreacted acetone, filtered and washed with about 5 liters of water on a Buchner funnel. The sample was then washed with benzene to remove any unreacted diphenylol propane. The product was filter dried under vacuum 24", at 120° C. for 8 hours. The melting point was 188° C. The product had a m. weight of 496.

EXAMPLE III

The product of Example II above was tested for oxidation inhibiting efficiency on GR–I rubber (low unsaturation isobutylene-diolefin polymer, see U. S. 2,356,128), a copolymer of isobutylene and isoprene. This test was conducted as follows: A small piece of control raw GR–I rubber containing no inhibitor was placed in a dark air oven maintained at a temperature of 110° C. Staudinger molecular weights were determined before and after the aging on all samples. Similar tests were run on a polyisobutylene synthetic rubber known as Vistanex having a Staudinger molecular weight of about 200,000. The results follow:

GR-I RUBBER

| | Time | | | | |
|---|---|---|---|---|---|
| | 0 Days | 2 Days | 8 Days | 10 Days | 14 Days |
| Blank GR-I | 33,000 | 21,000 | 12,000 | 9,000 | 9,000 |
| GR-I+0.25% of product of Example II | 33,000 | 27,000 | 24,000 | 18,000 | 17,000 |

VISTANEX

| | 0 Days | 2 Days | 8 Days | 20 Days |
|---|---|---|---|---|
| Vistanex | 194,000 | 117,000 | 88,000 | 72,200 |
| Vistanex+0.25% of product of Example II | 197,000 | 167,200 | 133,000 | 121,000 |

It should be noted how the products of this example produced an improvement of almost 100% in molecular weight retention.

EXAMPLE IV

The product of Example II was tested for its antioxidant effect on Paracril–26 (a butadiene-acrylonitrile synthetic rubber). The results follow:

| | Oven aging at 170° F. in Dark Air Oven | | |
|---|---|---|---|
| | 0 Days | 7 Days | 14 Days |
| Paracril, Control, percent gel | 1.1 | 65.8 | 89.9 |
| Paracril + condensation product of Example II, percent gel | 2.2 | 17.7 | 42.6 |

It should be noted that the control exhibited a gel formation more than twice as great as the sample containing the product of this invention.

EXAMPLE V

In this example the test used to evaluate the products claimed in this invention was the ASTM oxidation stability test designated as ASTM D–525–46. Essentially, this test consists of placing 50 cc. of the composition in a bomb, after which oxygen is added to provide a pressure of about 100 lbs. p. s. i. g. The bomb is then heated to about 100° C. and the pressure in the bomb determined at 15-minute intervals. When sufficient time has passed so that the pressure drops two pounds p. s. i. g. in 15 minutes, the test is discontinued and the time required to reach this condition is recorded at the induction period or the ASTM breakdown time and is ordinarily given in minutes. The material tested was an iso-octyl alcohol produced by the well-known synthetic "Oxo Process."

| | ASTM Breakdown |
|---|---|
| Blank iso-octyl alcohol | 12.1 hrs. for 10 lb. drop in p. |
| Iso-octyl alcohol+0.01% product of Example II. | 27.4 hrs. for 10 lb. drop in p. |

It should be noted that a greater than 100% improvement in stability was obtained.

EXAMPLE VI

The product of Example I was tested as an anti-oxidant for Vistanex and GR–I rubber in the same manner as stated in Example III above. The results follow:

| Polymer | Wt. Percent Antioxidant | Original Staudinger, M. Wt. | Final M. Wt. after 21 Days at 110° C. |
|---|---|---|---|
| Vistanex | 0.0 | 95,000 | 17,000 |
| Do | 0.25 | 94,000 | 87,000 |
| Do | 0.50 | 94,000 | 89,000 |
| GR–I | 0.0 | 40,000 | 8,000 |
| GR–I | 0.25 | 44,000 | 22,000 |

These results show that from a three to a greater than five fold improvement in molecular weight retention was obtained through the use of the product of this invention.

EXAMPLE VII

The product of Example I was tested as an anti-oxidant for Paracril in the same manner as Example IV above. The results follow:

When 1% of the anti-oxidant was added to the Paracril, only 21% gel was formed after 14 days at 78° C. The control formed 59% gel, or almost three times as much.

EXAMPLE VIII

The product of Example II was tested as a stabilizer on a synthetic resin containing a plasticizer. The resin composition was as follows:

In one test a mixture was made as listed below:

| | G. |
|---|---|
| VYNW (97% polyvinyl chloride–3% polyvinyl acetate) | 100 |
| Diisooctyl phthalate | 50 |
| $PbCO_3$ basic | 3 |
| Product of Example II | 1 |

The mixture was held on a rubber mill at 330° F. for one-half hour. At the end of this time the plastic was quite elastic and of perfect color. In a like mixture, without the compound of this invention, the plastic was dark brown in color.

EXAMPLE IX

The condensation product of Example I was tested as a stabilizer in polyvinyl chloride films. The experimental anti-oxidant, the reaction product of acetone and diphenylol propane, was compared to diphenylol propane stabilized and unstabilized polyvinyl chloride films for evidence of anti-oxidant activity.

Criteria regarded as the most reliable measure of degradation in PVC-plasticizer systems are retention of original extensibility and color with aging. Examination of the attached heat aging results discloses the uninhibited compounds, DOP and DIOP–PVC (stocks 1 and 2 respectively), as possessing poor heat stability. After seven days' exposure at 100° C., DOP retains only 69% of its original elongation and 18% light transmission (opaque). The DIOP–PVC film retains only 42% extensibility and is also opaque after 7 days' heat aging. A contrast in stability is offered by the anti-oxidant stabilized compositions. Stock 4 containing the experimental anti-oxidant, shows a level of heat resistance equivalent to or better than straight diphenylol propane, stock 3. After 7 days' heat exposure essentially 105% tensile and 85% elongation remain for both inhibited systems. Aged film clarity appears to be very good for both compounds.

Based on the data, it can be concluded that the experimental anti-oxidant is equal to or better than diphenylol propane in effectiveness in stabilizing ester plasticizer-polyvinyl chloride compositions. The detailed data follow:

| | 1 | 2 | 3 | 4 |
|---|---|---|---|---|
| Geon 101 (100% polyvinyl chloride) | 100 | 100 | 100 | 100 |
| Vanstay (sodium orgemo phosphate) | 2 | 2 | 2 | 2 |
| Lead Stearate | 1 | 1 | 1 | 1 |
| Di-2-ethyl hexyl phthalate | 50 | | | |
| Di-iso-octyl phthalate | | 50 | 50 | 50 |
| Exp. Anti-oxidant (reaction product of acetone and diphenylol propane) | | | | .05 |
| Unmodified diphenylol propane | | | .05 | |

ORIGINAL TENSILES

| | | | | |
|---|---|---|---|---|
| Tens | 2,955 | 3,055 | 3,130 | 2,955 |
| Elongation | 275 | 275 | 245 | 275 |
| Modulus 100% | 1,820 | 1,995 | 2,200 | 1,890 |
| Percent Light Transmission | 70 | 72 | 77 | 77 |

OVEN AGED 4 DAYS @ 100° C.

| | | | | |
|---|---|---|---|---|
| Tens | 2,890 | 2,690 | 3,225 | 3,145 |
| Elongation | 235 | 170 | 250 | 250 |
| Modulus 100% | 2,275 | 2,385 | 2,570 | 2,465 |
| Percent Tens. Retained | 98 | 88 | 103 | 106 |
| Percent Elong. Retained | 85 | 62 | 102 | 91 |
| Percent Light Transmission | 40 | 20 | 69 | 72 |

OVEN AGED 7 DAYS @ 100° C.

| | | | | |
|---|---|---|---|---|
| Tens | 2,875 | 2,605 | 3,260 | 3,130 |
| Elongation | 190 | 115 | 210 | 230 |
| Modulus 100% | 2,525 | 2,515 | 2,920 | 2,810 |
| Percent Tens. Retained | 97 | 85 | 104 | 106 |
| Percent Elong. Retained | 69 | 42 | 86 | 84 |
| Percent Light Transmission | 18 | 18 | 64 | 68 |

It is to be seen from the above examples that the compounds of this invention provide markedly effective oxidation inhibition. As a result of these tests, it is contemplated in accordance with this invention that the class of inhibitors indicated can be used to stabilize oxidation unstable mixtures. The compounds are particularly adapted for use with synthetic branched alcohols, synthetic resins, and wax-polymer blends.

The branched chain alcohols that can be stabilized by the products of this invention include those synthetic alcohols prepared by the "Oxo Process" (see, for example, U. S. Patent No. 2,327,066 and U. S. Bureau of Mines Publication R1 4270, "Critical Review of Chemistry of the Oxo Synthesis, etc.," 1948), as well as branched chain alcohols, e. g., 2-ethyl hexanol, produced by other synthetic processes. The products also have utility with normal alcohols.

The products of this invention are also adapted for use, because of their high molecular weight, in resins, such as, for example, high molecular weight chlorine-containing resins such as polyvinyl chloride, vinyl chloride-acetate copolymers, polyvinylidene chloride, chlorinated polyethylene and chlorinated paraffin wax.

The synthetic rubbers which may be stabilized in accordance with this invention in addition to GR–I (isobutylenediolefin polymer) rubber are the polymers consisting predominantly of a polymerizable conjugated diolefin having 4 to 6 carbon atoms, e. g., 1,3-butadiene, isoprene, 2,3-dimethylbutadiene, 2-chloro-1,3-butadiene, piperylene, 2-methyl-1,3-pentadiene and the like; hence, synthetic rubbers of the above class include polymers of these materials and also copolymers prepared by the polymerization of monomer mixtures comprising a major proportion of such a polymerizable diolefin and also containing a minor proportion of other monoethylenically unsaturated compounds copolymerizable with the diolefin such as acrylonitrile, methyl acrylonitrile, methyl methacrylate, styrene, alpha methyl styrene, vinyl naphthalene, vinyl ketones, vinylidene chloride, diethyl fumarate, vinyl pyridine, and the like. Vulcanized natural rubber is also stabilized by the compounds of this invention.

The incorporation of the compounds with the synthetic rubber may be carried out simply by adding the compounds either in the pure form or in solution, suspension or emulsion to the solid synthetic rubber in a water dispersion, or they may be added, during the milling operation, which is the more convenient way in case of natural rubber and GR–I, to a latex containing the synthetic rubber dispersed in an aqueous medium such as is ordinarily obtained by an emulsion polymerization process.

The Vistanex (polyisobutylene synthetic rubber) compositions stabilized by the product of this invention have a Staudinger molecular weight of 40,000 to 300,000.

Mixtures of the compounds of this invention may be employed as well as the $P_2S_5$, chlorine, sulfur, barium, etc., derivatives. Styrene aralkylated compounds, as well as the alkylated compounds, can be employed.

The products of this invention can also be alkylated, sulfonated followed by treatment with metals such as sodium, barium, zinc, etc., as well as treated with sulfur, $SCl_2$, $P_2S_5$ to form new oil additives and anti-oxidants.

The amount of the indicated ingredients added to the normally oxidizable material in order to prevent oxidation varies with different materials.

In general, the amount that has to be added to the normally oxidizable material represents only a small proportion of the normally oxidizable substance, i. e., 0.0003–5 weight per cent based on the normally oxidizable material.

Typical formulations are as follows with the weight per cent figure based on the normally oxidizable substance:

|  | Per cent by weight |
|---|---|
| Resins, rubbers and plastics | 0.1 to 5 |
| Branched alcohol | 0.05 to 5.0 |

The compounds of this invention may be utilized in conjunction with other anti-oxidants in order to obtain desirable combinations of properties. Among the other anti-oxidant materials which may be so employed are phenyl-beta-naphthylamine and other aromatic amines, naphthols, substituted naphthols, substituted phenols, substituted catechols, substituted hydroquinones, alkyl phenol sulfides, ketone-amine condensation products and the like. Due to the fact that the compounds have good color, they may be mixed with 2,6-ditertiary-butyl-4-methyl phenol in rubber or resin compounds to form light colored stocks.

The anti-oxidant compounds of this invention have many advantages, among which are their extreme potency, ease of preparation, good color retention, non-staining and odorless character, and high molecular weight.

It is to be understood that the invention is not limited to the specific examples, which have been offered merely as illustrations, since other derivatives can be prepared, and that modifications may be made without departing from the spirit of the invention.

What is claimed is:

1. A composition of matter comprising an essentially paraffinic chlorine containing resin and as a stabilizer therefor a ketone condensation compound of a bisphenyl type compound, said ketone condensation compound having the general formula:

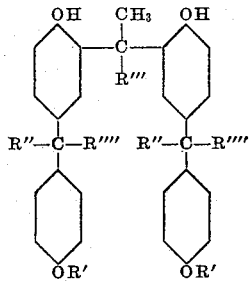

wherein R' is a radical selected from the group consisting of hydrogen and alkyl radicals having from 1 to 3 carbon atoms, R'' and R'''' are radicals, which can be the same or different, selected from the group consisting of hydrogen and alkyl radicals and the sum of the carbon atoms of R'' and R'''' does not exceed 5, and R''' is a radical selected from the group consisting of methyl and ethyl radicals.

2. A composition as in claim 1 in which the ketone condensation compound has the general formula:

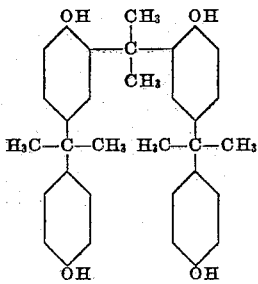

3. A composition as in claim 1 in which the ketone condensation compound has the general formula:

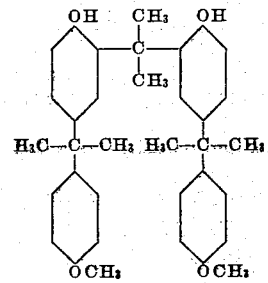

4. A composition of matter comprising a synthetic branched saturated, aliphatic, monohydric, unsubstituted, oxo alcohol normally subject to deteriorative changes on standing, and a minor amount, sufficient to prevent said deterioration, of a ketone condensation compound of a bisphenyl type compound, said ketone condensation compound having the general formula:

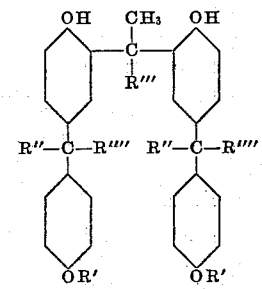

wherein R' is a radical selected from the group consisting of hydrogen and alkyl radicals having from 1 to 3 carbon atoms, R'' and R'''' are radicals, which can be the same or different, selected from the group consisting of hydrogen and alkyl radicals and the sum of the carbon atoms of R'' and R'''' does not exceed 5, and R''' is a radical selected from the group consisting of methyl and ethyl radicals.

5. A composition as in claim 4 in which the ketone condensation compound has the formula:

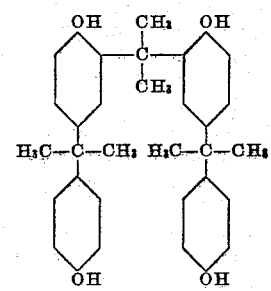

6. A composition as in claim 4 in which the ketone condensation compound has the formula:

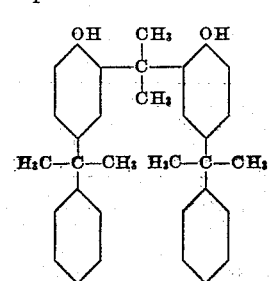

7. A plastic composition of matter comprising a polyvinyl chloride resin, a synthetic branched alcohol carboxylic acid ester as a plasticizer therefor, and a minor proportion of a ketone condensation compound of a bisphenyl type compound corresponding to the general formula:

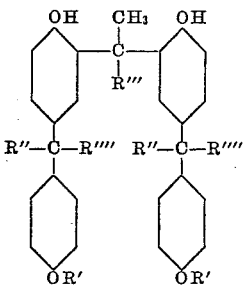

wherein R' is a radical selected from the group consisting of hydrogen and alkyl radicals having from 1 to 3 carbon atoms, R" and R"" are radicals, which can be the same or different, selected from the group consisting of hydrogen and alkyl radicals and the sum of the carbon atoms of R" and R"" does not exceed 5, and R'" is a radical selected from the group consisting of methyl and ethyl radicals.

8. A stabilized synthetic rubber composition comprising a butadiene acrylonitrile synthetic rubber having admixed therewith a minor proportion, effective as an antioxidant, of a ketone condensation compound of a bisphenyl type compound, said ketone condensation compound corresponding with the general formula:

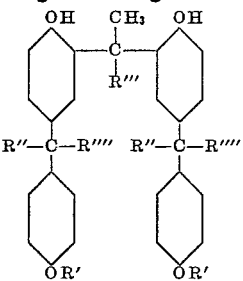

wherein R' is a radical selected from the group consisting of hydrogen and alkyl radicals having from 1 to 3 carbon atoms, R" and R"" are radicals, which can be the same or different, selected from the group consisting of hydrogen and alkyl radicals and the sum of the carbon atoms of R" and R"" does not exceed 5, and R'" is a radical selected from the group consisting of methyl and ethyl radicals.

9. A composition as in claim 8 in which the ketone condensation compound has the following formula:

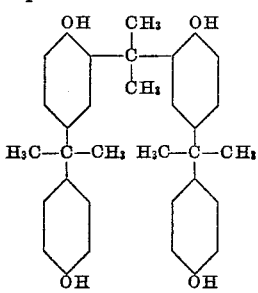

10. A composition as in claim 8 in which the ketone condensation compound has the following formula:

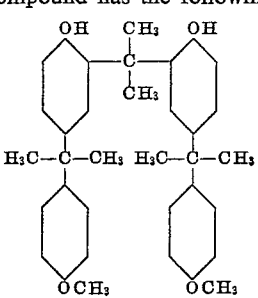

11. A stabilized synthetic rubber composition comprising a polyisobutylene synthetic rubber having a molecular weight of no greater than 300,000, having admixed therewith a minor proportion of a ketone condensation compound of a bisphenyl type compound, said ketone condensation compound having the general formula:

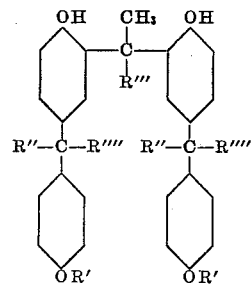

wherein R' is a radical selected from the group consisting of hydrogen and alkyl radicals having from 1 to 3 carbon atoms, R" and R"" are radicals, which can be the same or different, selected from the group consisting of hydrogen and alkyl radicals and the sum of the carbon atoms of R" and R"" does not exceed 5, and R'" is a radical selected from the group consisting of methyl and ethyl radicals.

12. A composition as in claim 11 in which the ketone condensation compound has the following formula:

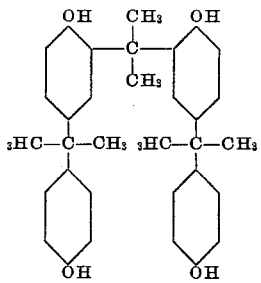

13. A method of stabilizing other organic material normally subject to oxidative deterioration which comprises adding thereto a minor proportion, effective as an antioxidant, of a ketone condensation compound of a bisphenyl type compound, said ketone condensation product corresponding to the general formula:

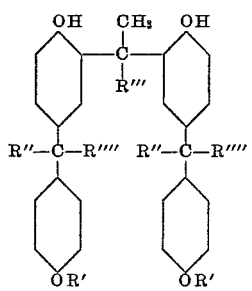

wherein R is a radical selected from the group consisting of hydrogen and alkyl radicals having from 1 to 3 carbon atoms, R" and R"" are radicals, which can be the same or different, selected from the group consisting of hydrogen and alkyl radicals and the sum of the carbon atoms of R" and R"" does not exceed 5, and R'" is a radical selected from the group consisting of methyl and ethyl radicals.

14. The process of claim 13 in which the ketone condensation product corresponds to the general formula
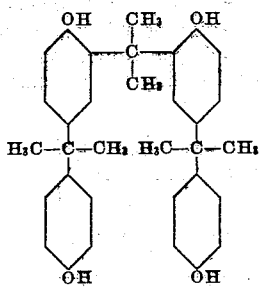
15. The process of claim 13 in which the ketone condensation product corresponds to the general formula
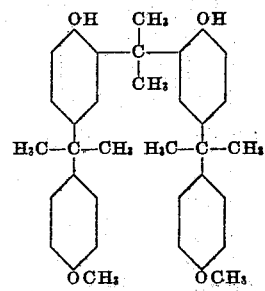
No references cited.